Patented Sept. 4, 1945

2,384,137

UNITED STATES PATENT OFFICE 2,384,137

PROCESS FOR THE MANUFACTURE OF PYRIDINE DERIVATIVES

Otto Schnider, Basel, Switzerland, assignor to Hoffmann-La Roche Inc., Nutley, N. J., a corporation of New Jersey No Drawing. Original application September 5, 1941, Serial No. 409,750. Divided and this application April 28, 1944, Serial No. 533,253. In Switzerland November 1, 1940

3 Claims. (Cl. 260—297)

Pyridine derivatives of the general formula

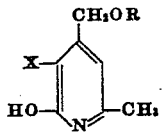

wherein R represents a lower alkyl radical and X is selected from the group consisting of carboxylic acid nitrile, carboxylic acid amide and carboxylic acid lower alkyl ester, are compounds which were found to be useful for the synthesis of vitamin B$_6$ (adermin). A process for the manufacture of compounds of this kind has become known from the Journal of the American Chemical Society, vol. 61, year 1939, page 1242. According to this paper, 2-methyl-4-ethoxy-methyl-5-cyano-6-hydroxypyridine can be obtained by condensing ethoxy-acetyl-actone with cyanacetic acid amide at moderately elevated temperature in the presence of a condensing agent.

The present invention relates to a new process for the manufacture of the said 2-methyl-4-ethoxymethyl-5-cyano-6-hydroxypyridine derivatives of the above general formula. It has been found that by reacting 2-amino-4-oxo-5-alkoxy-pentene (2) with cyano-acetamide 2-methyl-4-alkoxymethyl-5-cyano-6-hydroxy-pyridine may be obtained.

The compound 2-amino-4-oxo-5-alkoxypentene-(2) used as one of the starting materials may be prepared from alkoxy-acetyl-acetone by the action of ammonia thereon. Preferably, the 5-ethoxypentene-(2) derivative may be used. Other lower alkyl groups may, however, take the place of the ethyl radical. It may, further, in some instances be unnecessary to isolate the 2-amino-4-oxo-5-ethoxypentene-(2) because surprisingly the reaction with certain derivatives of malonic acid or cyanacetic acid occurs equally well in aqueous and non-aqueous solutions.

As the second starting material cyano-acetamide of the formula H$_2$NCO—CH$_2$—CN may be used. It is helpful to add a solvent and to heat the reaction mixture.

The following example shows in detail methods for the execution of the invention, without, however, limiting its scope thereto.

Example

A mixture of 143 parts by weight of 2-amino-4-oxo-5-ethoxy-pentene-(2) and 84 parts by weight of cyano-acetamide is heated. At about 120° C. ammonia is slowly evolved and a homogeneous solution is obtained. The temperature is slowly raised to 140–150° C. when the separation of ammonia becomes more and more intensive. After some time 2-methyl-4-ethoxy-methyl-5-cyano-6-hydroxy-pyridine begins to crystallise. When the separation of ammonia has ceased, on keeping the temperature constantly between 140–150° C., which is the case after 1½ to 2 hours, the reaction is complete. On cooling, 2-methyl-4-ethoxymethyl-5-cyano-6-hydroxy-pyridine solidifies completely. It can be purified by dissolving in a dilute solution of caustic soda and precipitation with an acid or by crystallisation from ethyl-alcohol. It melts at 210° C.

The reaction succeeds in the same way if anisole is used as solvent.

I claim:

1. In a process for the manufacture of 2-methyl-4-alkoxy-methyl-5-cyano-6-hydroxy-pyridine the step comprising reacting 2-amino-4-oxo-5-alkoxy-pentene-(2) with cyanoacetamide.

2. In a process for the manufacture of 2-methyl-4-alkoxy-methyl-5-cyano-6-hydroxy-pyridine the step comprising reacting 2-amino-4-oxo-5-alkoxy-pentene (2) with cyanoacetamide at elevated temperature in the presence of a solvent.

3. In a process for the manufacture of 2-methyl-4-alkoxy-methyl-5-cyano-6-hydroxy-pyridine the step comprising reacting 2-amino-4-oxo-5-ethoxy-pentene-(2) with cyanoacetamide at elevated temperature in the presence of a solvent.

OTTO SCHNIDER.